United States Patent [19]

Chen

[11] Patent Number: 5,398,413
[45] Date of Patent: Mar. 21, 1995

[54] COAXIAL CABLE STRIPPER

[76] Inventor: Ching-Jen Chen, No. 71, Mei Ning St. Tai Shan Hsiang, Taipei Hsien, Taiwan, Prov. of China

[21] Appl. No.: 227,133

[22] Filed: Apr. 13, 1994

[51] Int. Cl.6 ............................................. H02G 1/12
[52] U.S. Cl. ....................................... 30/90.1; 30/91.2
[58] Field of Search ....................... 30/90.1, 90.2, 90.3, 30/91.2, 241; 81/9.4, 9.41, 9.42, 9.43

[56] References Cited

U.S. PATENT DOCUMENTS

| | | | |
|---|---|---|---|
| 3,254,407 | 6/1966 | Apa et al. | 30/91.2 |
| 4,366,619 | 1/1983 | Bieganski | 30/90.1 |
| 4,979,299 | 12/1990 | Bieganski | 30/90.1 |
| 5,009,130 | 4/1991 | Bieganski | 30/90.1 |

Primary Examiner—Douglas D. Watts
Attorney, Agent, or Firm—Bacon & Thomas

[57] ABSTRACT

A coaxial cable stripper includes a base frame having three cable grooves across the bottom of a rectangular slot thereof, a cable locating device made to slide in the rectangular slot and supported on a spring to hold down the coaxial cable to be processed, and three cutter blades fastened to the base frame at the bottom and having a respectively cutting edge projecting into either cable groove at a different distance for cutting into the coaxial cable at a different depth.

1 Claim, 6 Drawing Sheets

COAXIAL CABLE STRIPPER

BACKGROUND OF THE INVENTION

The present invention relates to coaxial cable strippers, and more particularly to a simple structure of coaxial cable stripper which is easy to operate for accurately stripping off the insulators of coaxial cables of different sizes.

Various coaxial cable strippers have been disclosed for cutting off the insulators of coaxial cables, and have appeared on the market. FIG. 1 shows a coaxial cable stripper according to the prior art which is made in the shape of a pincers, comprised of an upper cable groove and a lower cable groove for holding down the coaxial cable to be cut, a movable locating block disposed in the upper locating groove and adjusted according to the size of the coaxial cable to be cut, a replaceable cutter holder to carry a cutter, and an adjusting screw controlled to adjust the position of the cutter. When the cable to be cut is inserted in between the upper and lower cable grooves, the movable locating block is properly adjusted to hold down the cable, and then the coaxial cable stripper is turned relative to the cable causing the outer insulator of the cable cut. FIG. 2 shows another structure of cable stripper according to the prior art which comprises a base frame having cable groove for receiving the cable to be cut, two replaceable sliding blocks of different sizes alternatively mounted on the base frame and moved to hold down the cable to be cut, and a cutter fastened to the cable groove opposite to the sliding block being installed, a finger hole for inserting the finger in turning the cable stripper relative to the cable to be cut, and an adjusting screw controlled to adjust the position of the cutter.

The aforesaid two different cable strippers are complicated in structure, and therefore they are complicated and expensive to manufacture. These two different cable strippers commonly use an adjusting screw to adjust the position of the cutter according to the size of the cable (insulator) to be cut. However, it is difficult to accurately adjust the position of the cutter to achieve the desired cutting depth. Therefore, this arrangement greatly complicates the operation of the cable stripper.

SUMMARY OF THE INVENTION

The present invention has been accomplished to provide a coaxial cable stripper which eliminates the aforesaid drawbacks. It is one object of the present invention to provide a coaxial cable stripper which is simple in structure. It is another object of the present invention to provide a coaxial cable stripper which is inexpensive to manufacture. It is still another object of the present invention to provide a coaxial cable stripper which is easy to operate for cutting coaxial cables of different sizes without adjusting the position of the cutter blades. It is still another object of the present invention to provide a coaxial cable stripper which automatically holds down the coaxial cable to be cut when it is inserted, without making any adjustment.

To achieve these objects, there is provided a coaxial cable stripper comprised of a base frame having three cable grooves of different pitches across the bottom of a rectangular slot thereof, a cable locating device made to slide in the rectangular slot and supported on a spring to hold down the coaxial cable to be processed, and three cutter blades fastened to the base frame at the bottom and having a respectively cutting edge projecting into either cable groove at a different distance for cutting into the coaxial cable at a different depth. Because the cutting edges of the cutter blades project into the cable grooves at different distances, they cut into the coaxial cable at different depths, and therefore it is not necessary to adjust the positions of the cutter blades.

DETAILED DESCRIPTION OF THE PREFERRED EMBODIMENT

Figure 1:
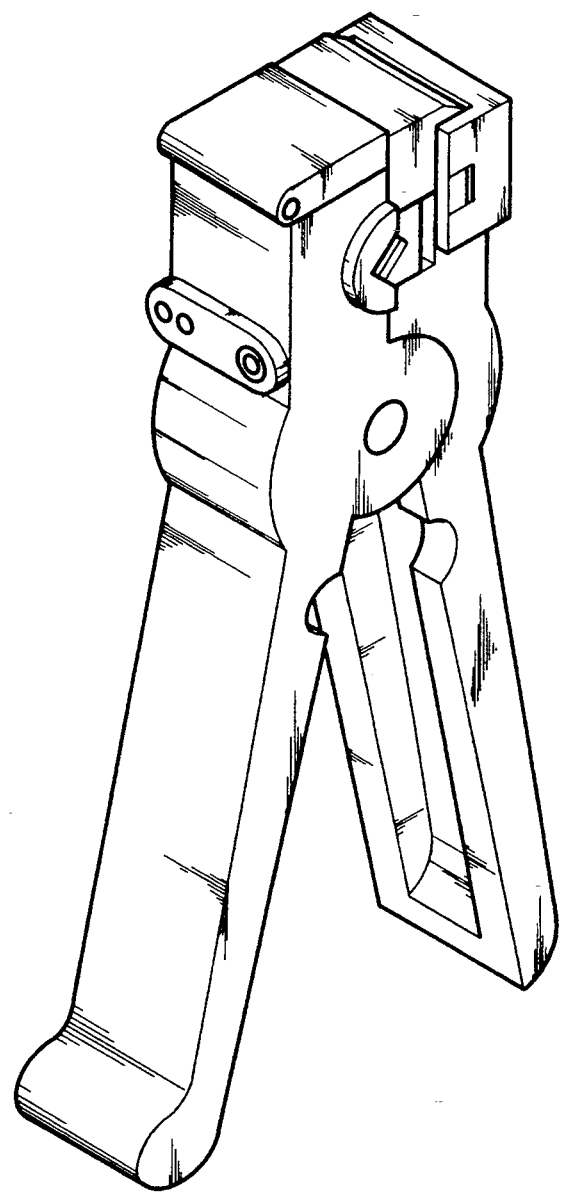
FIG. 1 is an elevational view of a cable stripper according to the prior art.
Figure 2:
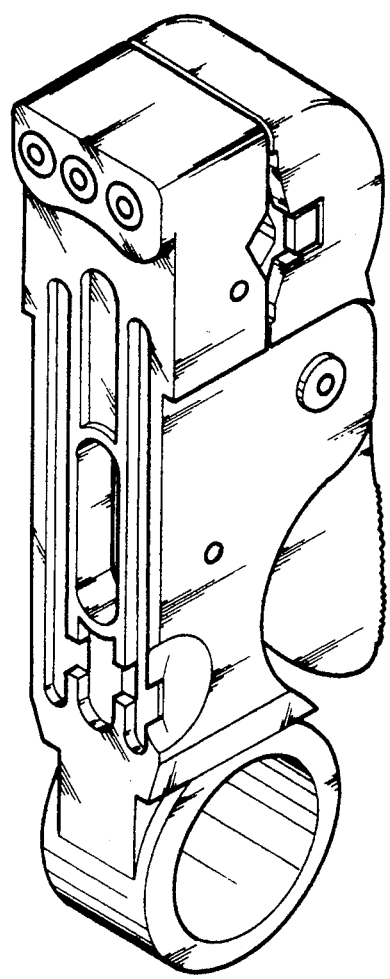
FIG. 2 is an elevational view of another structure of cable stripper according to the prior art.
Figure 3:
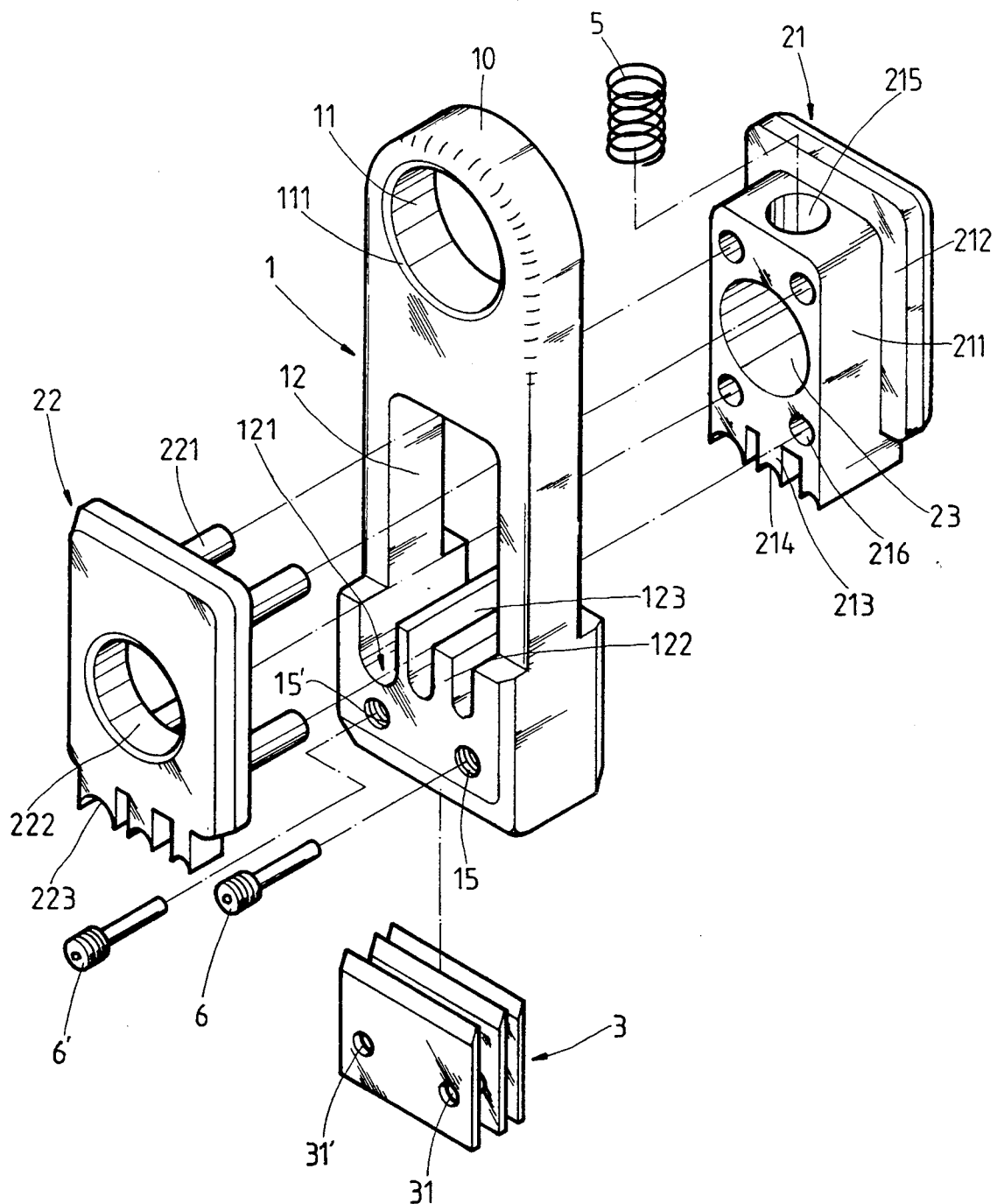
FIG. 3 is an exploded view of a coaxial cable stripper according to the preferred embodiment of the present invention.
Figure 4:
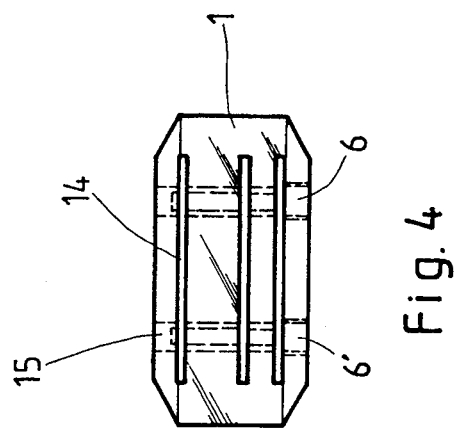
FIG. 4 is a bottom view of the coaxial cable stripper shown in FIG. 3.
Figure 5:
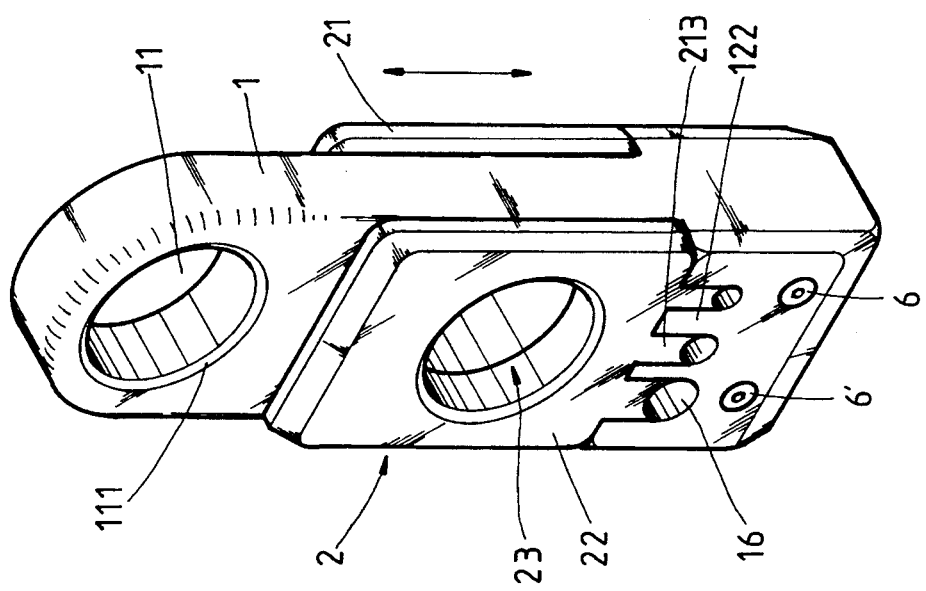
FIG. 5 is an elevational view of the coaxial cable stripper shown in FIG. 3.

Referring to FIGS. 3, 4, and 5, a coaxial cable stripper in accordance with the preferred embodiment of the present invention is generally comprised of a base frame 1, a cable locating device 2, and a set of cutter blades 3.

The base frame 1 is made of elongated, flat shape having a top end 10 arched for the purpose of material saving and cost reduction. A finger hole 11 is made through the arched end 10. The periphery of the finger hole 11 is smoothly chamfered 111 so that the finger will not be hurt when inserted into the finger hole 11. A rectangular slot 12 is made on the base frame 1 in the middle, three parallel cable grooves 121 of different sizes are disposed across the bottom of the rectangular slot 12 and separated from one another by ribs 122 for receiving coaxial cables of different sizes respectively. The ribs 122 define a respective stop wall 123 for positioning the cable locating device 2. Three cutter slots 14 are made on the bottom of the base frame 1 and perpendicularly disposed in communication with the cable grooves 121. Two screw holes 15;15' are made on the base frame 1 and intersecting the cutter slots 14. The set of cutter blades 3 are respectively inserted in the cutter slots 14 and fixed in position by inserting two lock bolts 6 through the screw holes 15;15' on the base frame 1 and respective mounting holes 31;31' on the cutter blades 3. When installed, the edge of each cutter blade 3 projects into either cable groove 121 at a respective fixed distance for respectively cutting into the coaxial cable at a different depth.

The cable locating device 2 comprises a first locating plate 21 and a second locating plate 22 connected through doweled joints. The first locating plate 21 comprises a back wall 212 fitted over the base frame 1 at the back, a rectangular block 211 raised from the back wall 212 and inserted into the rectangular slot 12 on the base frame 1, a circular finger hole 23 through the rectangular block 211 and the back wall 212, a plurality of dowel holes 216 spaced around the finger hole 23, three chucking rods 213 disposed in parallel at the bottom and moved to insert into the cable grooves 121 and having a respective arched bottom edge 214 at the bottom fitting over the insulators of the coaxial cable to be processed, and a longitudinal spring mounting hole 215 on the rectangular block 211 at the top for receiving a spring 5. The second locating plate 22 comprises a finger hole 222 in the center aligned with the finger hole 23 on the first locating plate 21, a plurality of dowels 221 perpendicularly raised from the front surface thereof and respectively fitted into the dowel holes 216 on the first locating plate 21 causing the first and second locating plates 21;22 slidably retained to the base frame 1 at two opposite sides, and a plurality of chucking rods 223 respectively side matched to the chucking rods 213 on the first locating plate 21. When the first and second locating plates 21;22 are fastened together and coupled to the base frame 1, the stop walls 123 of the ribs 122 are respectively fitted into the space between either two adjacent chucking rods 213;223 on the first and second locating plates 21;22 so that the cable locating device 2 will not be moved out of course.

Figure 6:
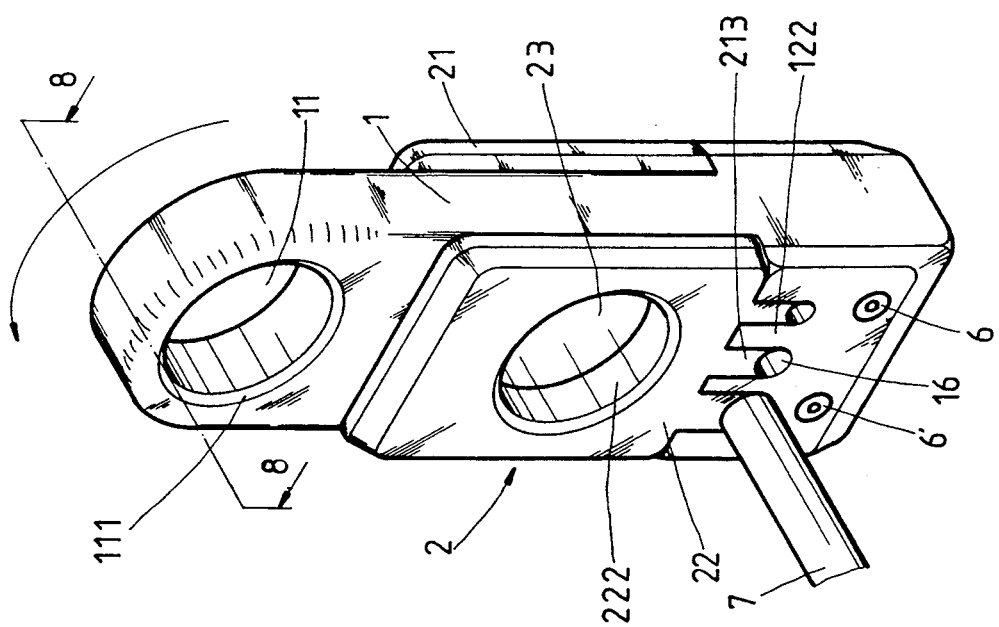
FIG. 6 is similar to FIG. 5 but showing the coaxial cable stripper operated.
Figure 7:
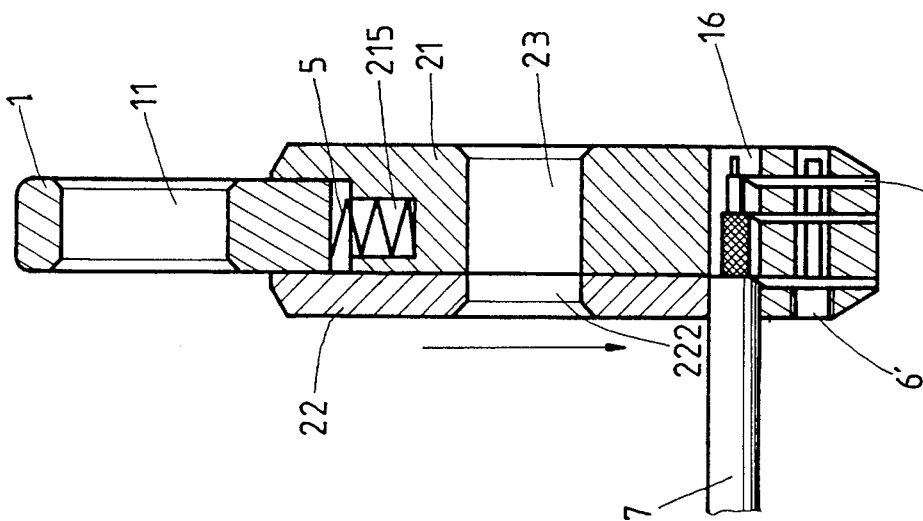
FIG. 7 is a longitudinal view in section of the coaxial cable stripper shown in FIG. 5.

The aforesaid spring 5 is received in the spring mounting hole 215 and stopped against the top of the rectangular slot 12 on the base frame 1, therefore the spring 5 gives a downward pressure to the cable locating device 2 causing the chucking rods 213;223 inserted into the cable grooves 121 respectively. Therefore, the cable locating device 2 can be moved upwards to compress the spring 5 (as shown in FIG. 7) for letting the coaxial cable to be processed 7 be inserted in either cable groove 121 for cutting. When the coaxial cable to be processed 7 is inserted in either cable groove 121, the spring 5 immediately pushes the cable locating device 2 downwards causing the respective chucking rods 213;223 to hold down the coaxial cable 7 (See FIG. 6).

Figure 8:
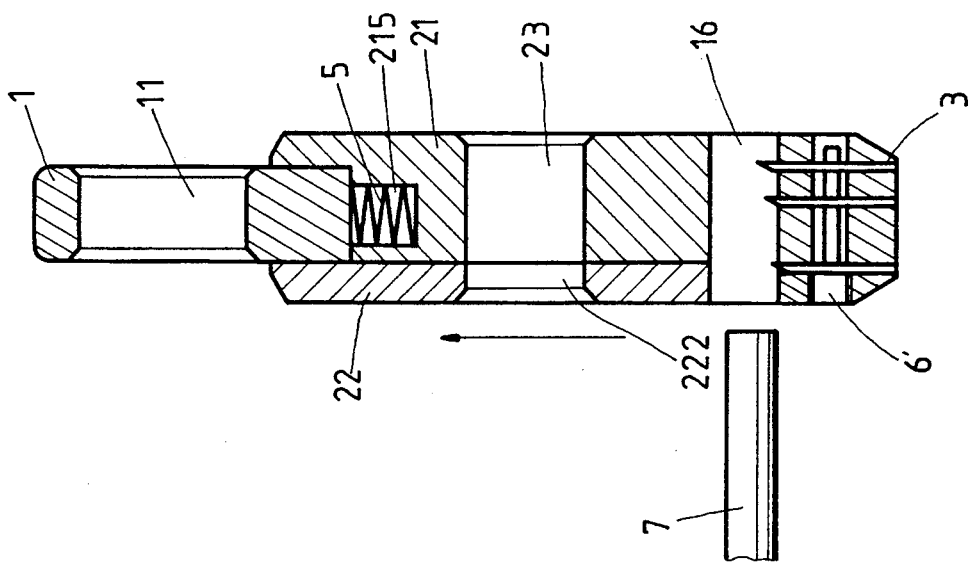
FIG. 8 is similar to FIG. 7 but showing the coaxial cable stripper operated.

Referring to FIGS. 7 and 8, by inserting a finger into the finger holes 222;23 to pull the cable locating device 2 upwards relative to the base frame 1, the chucking rods 213;223 are lifted from the cable grooves 121, and therefore a cable hole 16 is defined between either cable groove 121 and the respective chucking rods 213;223 for inserting the coaxial cable 7. When the pressure is released from the cable locating plate 1, the coaxial cable 7 is chucked in the cable hole 16 against the cutter blades 3. When the coaxial cable 7 is retained in position, a finger is inserted through the finger hole 11 and moved to turn the coaxial cable stripper relative to the coaxial cable 7, and therefore the outer and inner insulators as well as the braided outer conductor of the coaxial cable are properly cut (see FIG. 8).

As indicated, the cable grooves 121 are made in different diameter for cutting coaxial cables of different sizes without changing the position of the cutter blades 3.

I claim:
1. A coaxial cable stripper comprising:
   a base frame made of elongated, flat shape having an arched top end, a finger hole on said arched top end, a rectangular slot in the middle defining a transverse top wall near the finger hole on said arched top end and a transverse bottom wall, three parallel cable grooves of different sizes across said transverse bottom wall and spaced from one another by ribs for receiving coaxial cables of different sizes, three cutter slots transversely disposed on a bottom side thereof and perpendicularly disposed in communication with said cable grooves;
   a plurality of cutter blades respectively fastened to said cutter slots and having a respective cutting edge projecting into either cable groove at a different distance; and
   a cable locating device fastened to said base frame and moved to slide along the rectangular slot of said base frame, said cable locating device comprising a first locating plate and a second locating plate connected together through doweled joints and coupled to said base frame at two opposite sides, said first and second locating plates having each a plurality of chucking rods disposed at the bottom and respectively inserted into either cable groove on said base frame, said first locating plate having a rectangular block inserted into said rectangular slot of said base frame and moved to slide therein for permitting said chucking rods to be lifted from said cable grooves for inserting a respective coaxial cable into either cable groove for cutting, and a spring received in a top spring hole thereof, said spring having a bottom end received in said top spring hole and a top end stopped against said transverse top wall on said rectangular slot of said base frame for giving a downward pressure to said cable locating device causing said chucking rods to insert into said cable grooves in holding down the coaxial cable to be processed.

* * * * *